(12) United States Patent
Mizuyabu et al.

(10) Patent No.: US 6,370,630 B1
(45) Date of Patent: Apr. 9, 2002

(54) METHOD AND APPARATUS FOR CONTROLLING DATA FLOW IN A DATA PROCESSOR

(75) Inventors: Carl K. Mizuyabu, Thornhill (CA); Andy E. Gruber, Arlington; Brad Hollister, Newton, both of MA (US)

(73) Assignee: ATI International Srl, Barbados (KN)

( * ) Notice: Subject to any disclaimer, the term of this patent is extended or adjusted under 35 U.S.C. 154(b) by 0 days.

(21) Appl. No.: 09/272,463

(22) Filed: Mar. 19, 1999

(51) Int. Cl.[7] .............................................. G06F 12/00
(52) U.S. Cl. ...................................... 711/167; 710/127
(58) Field of Search ................................ 711/167, 122; 710/66, 127

(56) References Cited

U.S. PATENT DOCUMENTS

| | | | | |
|---|---|---|---|---|
| 5,829,026 A | * | 10/1998 | Leung et al. | 711/122 |
| 6,101,561 A | * | 8/2000 | Beers et al. | 710/66 |
| 6,101,565 A | * | 8/2000 | Nishtala et al. | 710/127 |

* cited by examiner

*Primary Examiner*—Do Huyn Yoo
*Assistant Examiner*—Nassar Moazzami
(74) *Attorney, Agent, or Firm*—Vedder, Price, Kaufman & Kammholz

(57) ABSTRACT

A method and apparatus for accessing an external memory having a first width at at at a first data rate. The external data is reformatted to have a second predefined width larger than the first width. The data having the second predefined width is then provided at a second rate to one of several possible processing units.

17 Claims, 3 Drawing Sheets

METHOD AND APPARATUS FOR CONTROLLING DATA FLOW IN A DATA PROCESSOR

FIELD OF THE INVENTION

The present invention relates to controlling data flow in a data processor, and specifically in a graphics controller.

BACKGROUND OF THE INVENTION

The ability of a data processor, such as a microcontroller, microprocessor, or graphics controller, to perform optimally is often limited by the rate at which data can be provided from a source external to the data processor. Recent industry trends toward Reduced Instruction Set Architectures (RISC) has increased the rate at which a data processors have been able to process data. Most general purpose high-end processors are capable of processing data at a data rate greater than external memory sources have been able to provide such data. When this happens, the data processor in effect stalls until the next data is available When possible, applications that demand performance, use external memories capable of matching or exceeding the data width and size requirements of the data processor. Because of standard memory speeds, when memories are fast enough to meet the data rate of the microprocessor it is often necessary to use a memory capable of a greater data rate than is actually needed by the data processor. This allows the data processor to access the external memory on an as-needed basis. However, this wastes bandwidth of the associated data processor and increases costs. Therefore, it is desirable for a cost-effective scheme for utilizing the bandwidth of the memory, and providing the desired data to the data processor.

The figures are intended to be for illustrative purposes only. As such, it should be understood that the figures are not drawn to scale, nor indicative of any final layout or other such relationship between the devices.

DETAILED DESCRIPTION OF THE DRAWINGS

In accordance with one embodiment of the present invention, a data processor accesses an external memory having a first width at a first data rate. The external data is reformatted to have a second predefined width larger than the first width. The data having the second predefined width is then provided at a second rate to one of several possible processing units. By scaling the width and data rate of data accessed from external memory, it is possible to more efficiently use the bandwidth of the external memory, and to support a variety of data widths as needed by internal processing units, thus avoiding additional external memory devices or logic.

Figure 1:
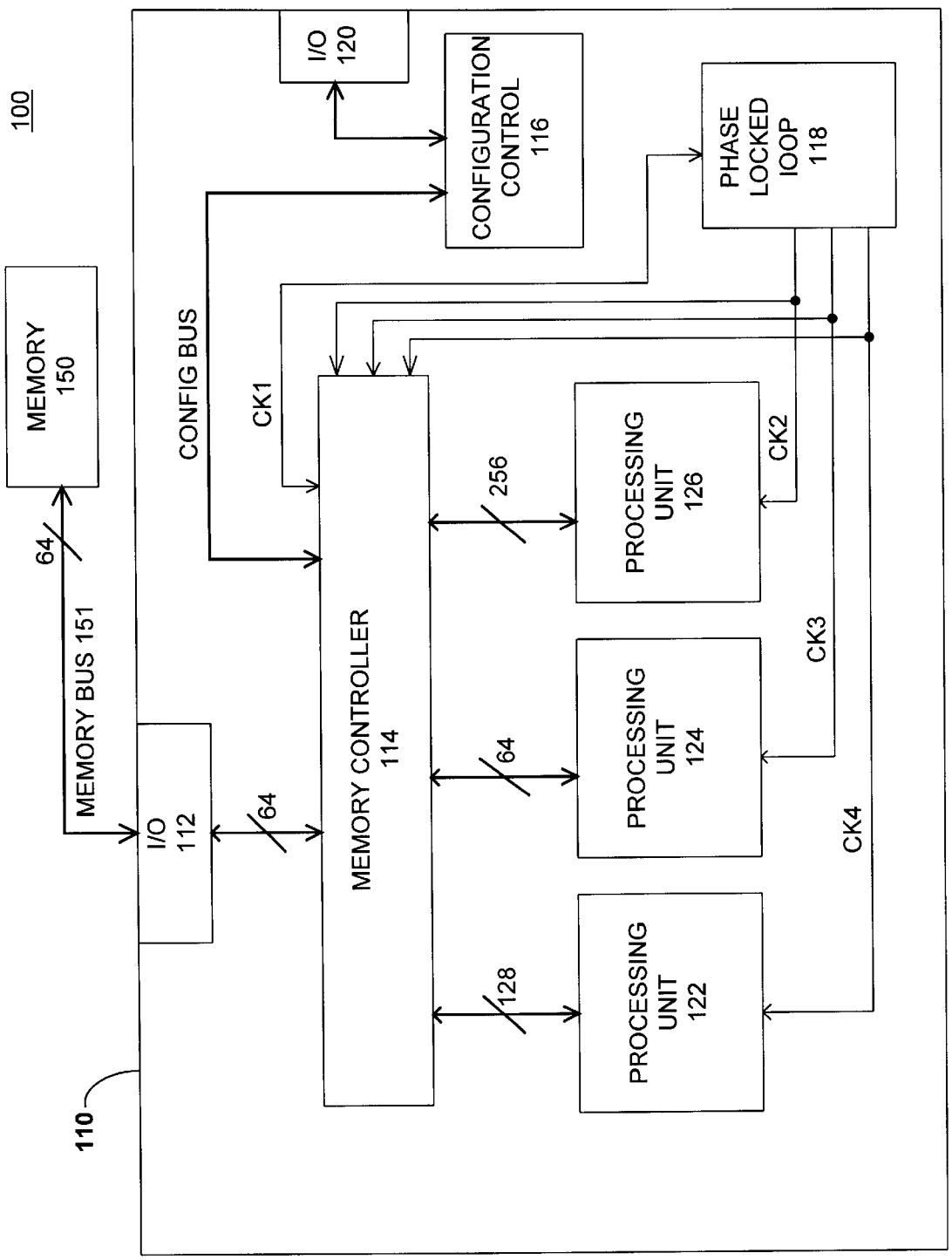
FIG. 1 illustrates a data processor, in block diagram form, for accessing an external memory in accordance with the present invention.

FIG. 1 illustrates a System 100 in accordance with the present invention. System 100 includes Data Processor 110 connected to external Memory 150 through Memory Bus 151. While Memory Bus 151 is illustrated having a width of 64, control signals (not shown) also exist.

Data Processor 110 further comprises I/O block 112, Memory Controller 114, Processing Unit 122, Processing Unit 124, Processing Unit 126, a second I/O block 120, Configuration Control 116, and phase locked loop 118.

In operation, the Memory 150 is connected to the I/O 112 through the Memory Bus 151, allowing data from Memory 150 to be transmitted and received by I/O block 112 of the Data Processor 110. The Memory Controller 114 is bi-directionally connected to each of Processing Unit 122, Processing Unit 124, and Processing Unit 126. In the embodiment indicated, each of the processing units are connected to the memory controller through buses having various bus widths. While only the data width of each bus is indicated, it should be appreciated that control signals also exist between the Processing Units 122–126, and the Memory Controller 114.

Processing Units 126, 124, and 122 are connected to the phase locked loop 118 to receive clock signals CK2, CK3, and CK4 respectively. In addition, the Memory Controller 114 is connected to the phase locked loop 118 to receive each of the clock signals CK1 through CK4. The I/O controller 120 is connected to Configuration Control 116. Configuration Control 116 is connected to the Memory Controller 114 in order to provide configuration information to the Memory Controller 114.

In a specific embodiment of the present invention, data will be received at the Memory Controller 114 from the Memory 150 via the 64-bit bus. The data rate for the Memory 150 is at a higher data rate than the data rate at which data is provided to the Processing Unit 122. For example, the data rate of the Memory 150 may be at 150 Mega-bits-per-second-per pin (Mbps) while the data rate to the Processing Unit 122 is at 75 Mbps. Note that a 64 bit bus is considered to have 64 pins, however, the data rate is a measure of how fast data is provided on a per pin basis. It should be understood that the data rates and bus widths used herein are illustrative of a specific embodiment, and that other widths and rates lend themselves equally well to the present invention.

Memory 150 can be a volatile memory, such as a dynamic Random Access Memory (RAM) or static RAM. Memory 150 can also be non-volatile memory such as a Read Only Memory (ROM), an Electrically Programmable ROM (EPROM), an Electrically Erasable PROM (EEPROM), a Flash EEPROM, or any other type of nonvolatile memory. In a specific embodiment, the Memory 150 comprises a Single Data Rate (SDR) Synchronous Dynamic Random Access Memory (SDR SDRAM). More specifically, the Memory 150 can comprise Synchronous Graphics Random Access Memories. (SGRAM)

The data transmitted to and from Memory 150 via the Data Processor 110 is transmitted through I/O 112. Generally, the I/O 112 will include a data port, such as an input output pad, and other circuitry logically needed to transmit the data from Memory 150. When in receive mode, the I/O 112 provides the received data to the Memory Controller 114 across the 64-bit internal bus connecting the Memory Controller 114 and the I/O 112. For purposes of illustration, the data path between the I/O 112, and Memory Controller 114 shall be considered to provide data at a maximum data rate of 150 Mbps.

Once received, the Memory Controller 114 acts as an interface between data accesses between the external Memory 150, and the Processing Units 122, 124, and 126.

For example, Memory Controller 114 receives data at a first data rate and bus width from the external Memory 150, and provides the data to one of the Processing Units 122, 124, 126 at a predetermined width and data rate. The width and data rate needed by Processing Units 122, 124, and 126 can be unique or common between each processing unit. For example, in order to provide the Processing Unit 122 with data 128 bits wide at 75 Mbps, it would be necessary for Memory Controller 114 to receive two data 64 bits wide for each one 128 bit wide data transferred to the processing unit. This can be accomplished by using a different latch within the Memory Controller 114 for each 64 bit width of data received from the external memory.

Another embodiment of the present invention allows Processing Unit 124, having the same width as the external Memory 150, to be accessed as well as processing units having varying widths. A processing unit having the same width as the external memory can access data at the same or slower rate as the external Memory 150. Where the data is used at a slower rate than the external memory, some buffering of the received memory may need to occur in order to maintain efficient transfer from external memory. Finally, Processing Unit 126 illustrates an embodiment where data having a width of 256 bits is used by the Processing Unit 126. A 256 bit bus can receive data from the 64-bit external memory at the full data rate, a provide the data to the Processing Unit 126 at 37.5 Mbps with a width of 256 bits.

The present invention is advantageous over the prior art in that it allows an external memory to be utilized more efficiently, where large, or variable, busses are needed internally. In addition, the present invention allows for all of the advantages of high-speed memory to be utilized without having processing units operating at the same high speed. These advantages are especially useful with video adapters/controllers, which generally operate on large amounts of data, but do not need operate at high clock rates.

In one embodiment, phase locked loop 118 is used in order to provide clock signals to Processing Units 122, 124, 126, and the Memory Controller 114. By using phase locked loop 118, it is possible to efficiently interface to various data rates as needed by processing units. The phase locked loop 118 may comprise one or more single phase locked loops as needed to provide clock signals to individual Processing Units 122 through 126. Phase locked loop 118 may provide fixed clock rates, or be configured through either the Memory Controller 114, Processing Units 122–126, or the Configuration Control 116 to provide a range of clock rates.

Configuration Controller 116 is connected to I/O 120 in order to receive, or transmit, configuration information from the System 100. The configuration information from System 100 can be received in any number of formats. For example, the information can comprise a value to be stored in a register. In one embodiment, a stored value would represent the ratio between the data width of the external memory bus and the data width of the processing unit to which data is to be provided. For example, the value 2 can represent a ratio where the external memory bus had a width ½ that of a corresponding processing unit (i.e. 64 bits external and 128 bits internal). Likewise, the configuration control unit 16 can have a register containing the actual speed or width values. In this embodiment, the value 150 would be stored to indicate an external memory bus data rate of 150 Mbps, while the value 75 would indicate the corresponding processing unit has a data rate of 75 Mbps is stored in a second register. This information will be provided from the Configuration Control 116 to the Memory Controller 114, thereby allowing the Memory Controller 114 to be configured to access external memory and the internal data processors at the desired rates and widths.

In yet another embodiment, the Configuration Control 116 can receive the specific bus rates, and the specific bus widths. This allows for some mismatching between the data rates and the bus size. For example, the configuration control unit 116 can store the bus width value of 64 for both the memory bus 150, and the Processing Unit 124, and also store data rates indicating that the memory bus is operating at 150 Mbps, while the processing unit is operating at 100 Mbps. In this situation, the memory controller will need to compensate for the mismatch in memory speed. This compensation can be accomplished either by buffering data within the Memory Controller 114, or by controlling the external memory bus in a more traditional manner whereby the bus is operated below its maximum possible operating speed.

Figure 2:
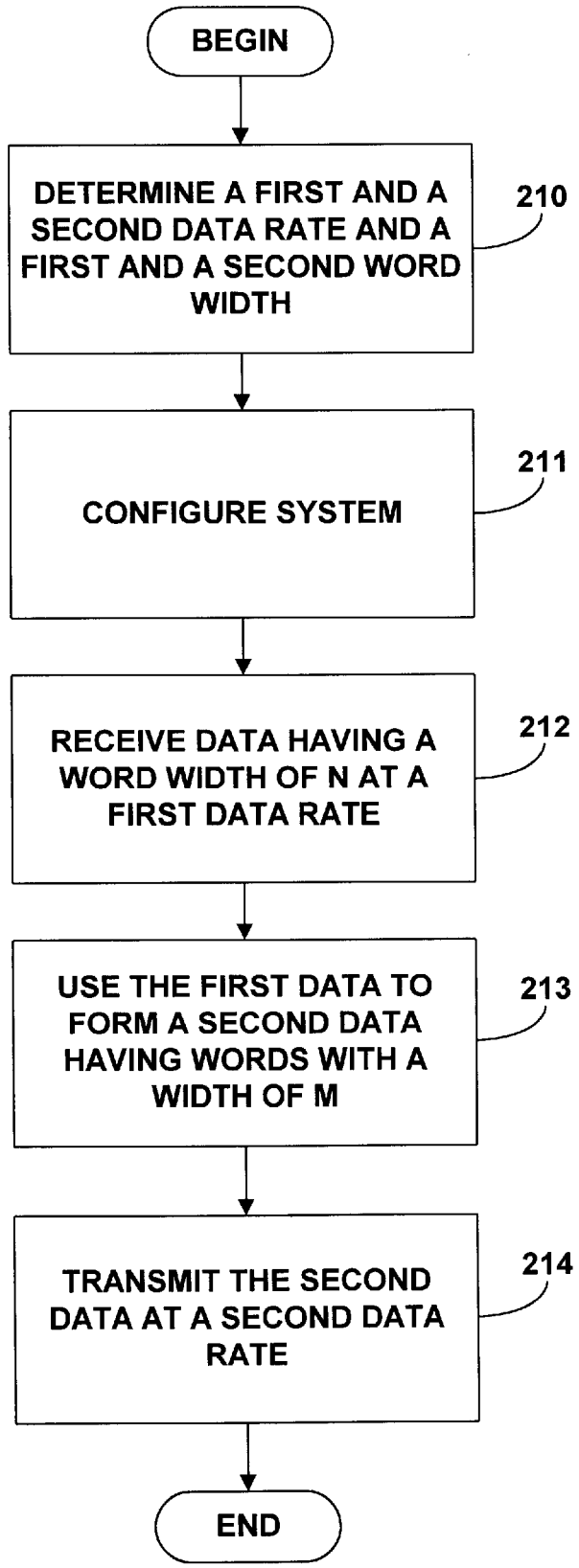
FIG. 2 illustrates a method, in flow diagram form, for controlling memory access in accordance with the present invention.

FIG. 2 is a flow diagram illustrating a specific embodiment of the present invention. At step 210 of the diagram, a first and second data rate is determined as well as a first and second data width. As discussed with reference to the Configuration Control 116 of FIG. 1, this can be accomplished in a number of ways. A first manner of determining the data rates and widths would be to store the ratio, actual relationship, between either the data rates or the word widths as a single value. From this single value, the corresponding data width or word size can be derived if the data rates and widths are known to be inversely proportional. For example, where the value 2 indicates that the word width of the internal bus is twice that of the external bus, the same value would indicate that the data rate of the external bus is twice that of the internal bus. Where this specific inverse relationship may not exist, separate values could be used to store the data rate ratio, and the data width ratio.

Another way of determining the first and second data rates and the first and second data word widths, would be for the microcontroller of FIG. 1 to automatically detect the width of data received, and automatically provide the ratio to the Configuration Control 116, or utilize the value internal to the Memory Controller 114.

At step 211, the system is configured in order to handle data. The actual configuration of the system can be accomplished by having the Memory Controller 114 retrieving specific configuration information from the Configuration Control 116. Next, at step 212, the actual data is received at a first data rate from an external N-bit memory. In the specific embodiment illustrated, N would be equal to 64 and the first data rate is 150 Mbps. Next, at step 213, the first data is used to form a second data having a width of M bits. When M is 128, as in the case of Processing Unit 122, the 64-bit wide data received from the Memory 150 is converted into a 128-bit wide data for use by the processing unit. Finally, in step 214, the second data is transmitted to a processing unit at a second data rate. If the external data was received at 150 Mbps, the data rate to the processing unit 75 Mbps, or half that of the data rate of the external Memory 150.

Figure 3:
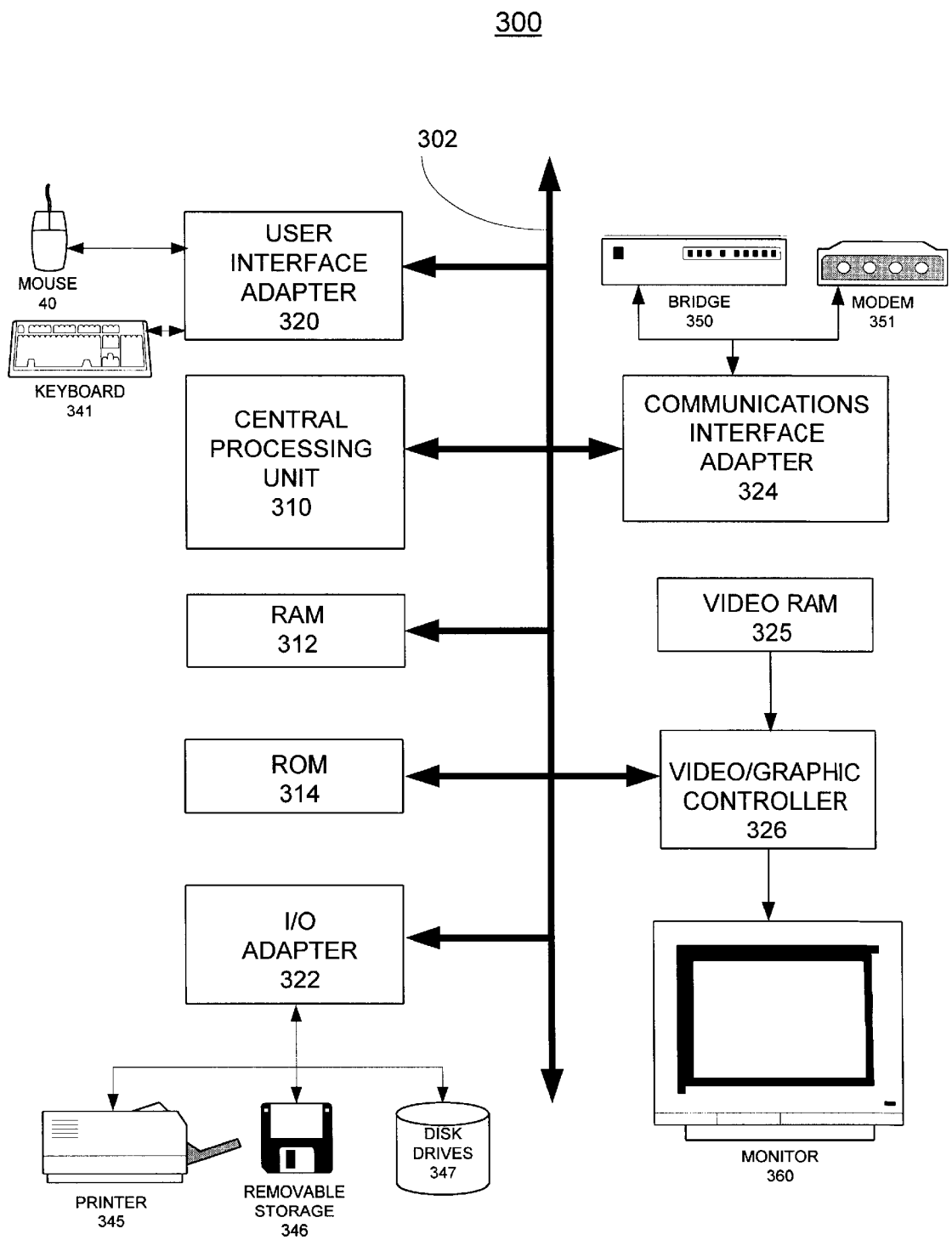
FIG. 3 illustrates a computer system capable of implementing specific embodiments of the present invention.

FIG. 3 illustrates a typical hardware configuration of a computer system capable of implementing specific embodiments of the present invention. The computer system 300 includes a Central Processing Unit (CPU) 310, such as would be found in a conventional microprocessor. In addition, a number of other peripherals or units are connected via a system bus 302.

The computer system 300, shown in FIG. 3, includes a random access memory 312, a read-only memory 334, and numerous I/O adapters. The I/O adapters include a user interface adapter 320, such as would be used to interface to a mouse 340, or a keyboard 341; an I/O adapter 322 as would be used to interface with a printer 345, a removable storage media 346, or a disk drive 347; a communications interface adapter 324 such as would be connected to a bridge 350 and/or a modem 351 which provides communications to external networks (not shown).

A video graphics controller 326, having a dedicated video ram 325, is connected to bus 302 in order to display information from other devices on the bus 302 to the to the monitor 360. It would be understood by one skilled in the art that other implementations of the computer system could be used. For example, the video graphics controller 326 may be bypassed and the monitor 360 drive directly across the bus 302 or a portion of the bus 302.

In operation, the data processor of FIG. 1 can be implemented within a portion of the computer system 300. For example, the video graphics controller 326 can include as part of its hardware the Data Processor 110 of FIG. 1 for interfacing the external memory, such as RAM 312 or ROM 334, to various Processing Units 122 through 126. In this implementation, the Processing Units 122 through 126 would be sub-units of the video graphics controller 326.

The present invention has been illustrated herein through the use of specific embodiments of the invention. One of ordinary skill in the art would appreciate that many variations to the present invention could be implemented. For example, while the Configuration Control 116 is shown as separate from the Memory Controller 114, it could just as easily be within the Controller 114. In addition, the Configuration Control 116 could detected external pins at predefined states to specify the relationship between the external memory and the internal processing units.

We claim:

1. A data processor comprising:
   an X bit data bus operating at a first data rate, where X is the width of the data bus;
   a Y bit data bus operating at a second data rate, where Y is the width of the data bus and X is a multiple of Y, and the second data rate is the first data rate multiplied by the multiple;
   a Y bit data port coupled to the Y bit data bus, the Y bit data port to receive data from an external memory at the second data rate;
   a first processing unit coupled to the X bit data bus to receive X bits of data simultaneously;
   a memory controller coupled to the Y bit data bus and the X-bit data bus; a configuration control operably coupled to the memory controller via a configuration bus; and
   a input/output port operably coupled to the configuration control whereby configuration information may be provided to the memory controller via the configuration control.

2. The data processor of claim 1, wherein the memory controller further comprises configuration circuitry for receiving the configuration information so as to set the multiple.

3. The data processor of claim 2, wherein the multiple is selected from a set of multiples including values of 1 and 2.

4. The data processor of claim 3, wherein set of multiples further includes a value of 1.6

5. The data processor of claim 2, wherein the configuration circuitry sets the multiple based on a predetermined first data rate and a predetermined second data rate.

6. The data processor of claim 1, wherein the Y bit data port is further to receive data from an external Dynamic Random Access Memory (DRAM).

7. The data processor of claim 1, wherein the Y bit data port is further to receive data from an external Single Data Rate (SDR) Synchronous Dynamic Random Access Memory (SDRAM).

8. The data processor of claim 1, wherein the Y bit data port is further to receive data from an external synchronous graphic random access memory.

9. The data processor of claim 1 further comprising:
   at least on Phase Locked Loop (PLL) operably coupled to the memory controller to generate the first and second data rates.

10. A computer system comprising:
    a memory having an X bit data port coupled to a first data bus;
    a first clock terminal coupled to the memory to provide a first clock rate at which data is provided;
    a second clock terminal to provide a second clock rate, wherein the second clock rate is to be less than the first clock rate;
    a memory controller coupled to the first and second clock terminal to receive data from the first data bus, and to provide data to a second data bus at the second clock rate, the memory controller further comprising:
      the second data bus having a greater number of bits than the first data bus;
      a first latch having an output connected to a first portion of the second data bus, and an input coupled to the first data bus; and
      a second latch having an output connected to a second portion of the second data bus, and an input coupled to the first data bus;
    a first processing unit coupled to the second data bus;
    a configuration control operably coupled to the memory controller via a configuration bus; and
    an input/output port operably coupled to the configuration control whereby configuration information may be provided to the memory controller via the configuration control.

11. The data processor of claim 10, wherein the memory includes a Single Data Rate Synchronous Dynamic Random Access Memory.

12. The data processor of claim 10, further comprising:
    at least on Phase Locked Loop (PLL) operably coupled to the memory controller to generate the first and second data rates.

13. The system of claim 10, further comprising at least one storage cell operably coupled to the input/output port for indicating a relationship between the first data bus and the second data bus.

14. The system of claim 13, where in the relationship is based on the respective sizes of the first and second data bus.

15. The system of claim 13, wherein the relationship is based on the respective first and second clock rates.

16. A memory having an X bit data port coupled to a first data bus comprising:
    a first clock terminal coupled to the memory to provide a first clock rate at which data is provided;
    a third clock terminal to provide a third clock rate, wherein the third clock rate is to be less than the first clock rate;
    the memory controller further coupled to the third clock terminal to receive data from the first data bus, and to provide data to a third data bus at the third clock rate, the memory controller further comprising:
      the third data bus having a greater number of bits than the first data bus;

a third latch having an output connected to a first portion of the third data bus, and an input coupled to the first data bus; and a fourth latch having an output connected to a second portion of the third data bus, and an input coupled to the first data bus;

a second processing unit coupled to the third data bus;

a configuration control operably coupled to the memory controller via a configuration bus; and an input/output port operably coupled to the configuration control whereby configuration information may be provided to the memory controller via the configuration control.

17. The system of claim 16, further comprising at least one storage cell operably coupled to the input/output port for indicating a relationship between the first data bus and the third data bus.

* * * * *